March 12, 1946.  C. E. FITCH  2,396,499

COUPLER

Filed March 22, 1944

INVENTOR.
CLIFFORD E. FITCH
BY Bair & Freeman
Attys.

Patented Mar. 12, 1946

2,396,499

UNITED STATES PATENT OFFICE 2,396,499

COUPLER

Clifford E. Fitch, Bryan, Ohio, assignor to The Aro Equipment Corporation, Bryan, Ohio, a corporation of Ohio Application March 22, 1944, Serial No. 527,547

5 Claims. (Cl. 285—169)

My present invention relates to a jaw coupler, particularly adapted for connection with headed grease reception fittings.

One object of the invention is to provide a comparatively simple and inexpensive coupler having automatic pressure operated means for holding the coupler engaged with the grease reception fitting, the holding tendency being increased as the grease pressure increases.

Another object is to provide a coupler wherein contractable jaws are mounted so that they may be readily slipped over the head of a fitting and manually held there until the grease pressure is supplied to the coupler, whereupon piston means within the coupler effects slight forward motion of the jaws, thereby contracting them around the fitting head to retain the coupler on the fitting.

Still another object is to provide a coupler of this kind which may be released from the fitting by releasing the pressure in the hose to the coupler so that the piston therein may be retracted by the jaws as they are expanded by pulling the coupler from the head of the grease fitting.

A further object is to provide a coupler of this general character which may utilize jaws having similar shaped ends so that they can be reversed when worn and their useful life thereby extended.

With these and other objects in view, my invention consists in the construction, arrangement and combination of the various parts of my coupler whereby the objects contemplated are attained, as hereinafter more fully set forth, pointed out in my claims and illustrated in the accompanying drawing, wherein:

Figure 1:
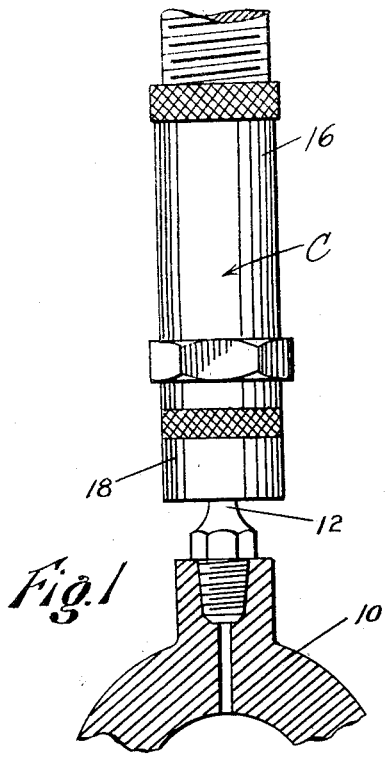
Figure 1 is a side elevation of a coupler embodying my invention and showing it engaged with a grease reception fitting.

On the accompanying drawing I have used the reference numeral 10 to indicate a bearing or the like in which a grease reception fitting 12 is mounted. The fitting 12 has a ball-like head 14 for the engagement of holding jaws therewith as will hereinafter appear.

My coupler is shown generally at C and comprises a sleeve-like body formed in two parts 16 and 18. These parts are connected together by means of screw threads or may be made in one piece if desired.

The body 16—18 has therein a piston which comprises a metal cup ring 20, a pair of packing washers 22 and a follower washer 24 of metal or suitable composition. A stationary disc 26 is mounted in the body sleeve and rigidly mounted with respect thereto is a stem 28. The disc 26 has passageways 27 for grease flow. The stem 28 is secured to the disc as by peening it thereto as indicated at 30. The stem 28 has a passageway 32 therethrough and at its lower end has a seat 34 for fitting the head 14 of the fitting 12.

The piston 20—22—24 surrounds the stem 28 and the packing washers 22 prevent leakage between the piston and the stem as well as between the piston and the interior bore of the sleeve 16. The piston washer 20 is provided with an outwardly facing shoulder 36, the purpose of which will hereinafter appear.

Figure 3:
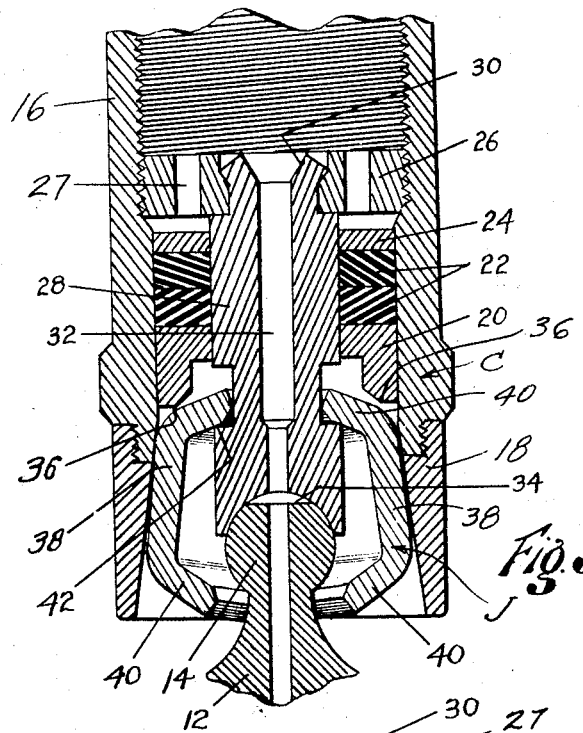
Figure 3 is an enlarged sectional view showing the coupler being placed on the fitting while the jaws are expanded; and, Figure 4 is a similar view showing the parts in the position they assume under application of fluid pressure to the coupler for contracting the jaws and supplying the fitting with lubricant.
Figure 2:
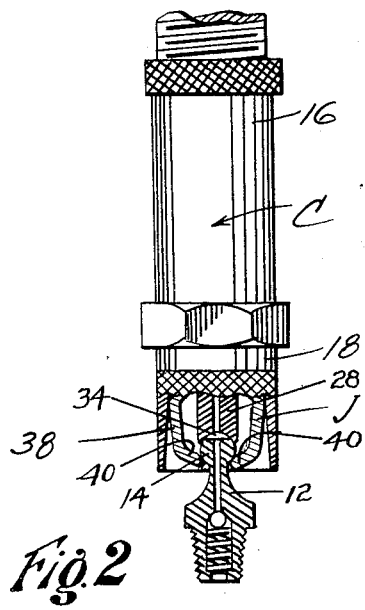
Figure 2 is a similar view showing the lower part of the coupler in section to illustrate the engagement of jaws in the coupler with the fitting.

In the coupler body is a plurality of C shaped jaws indicated generally at J. Preferably three of the jaws are used and each one in horizontal cross section is an arc of about 60° as shown in Neilsen Patent No. 2,263,850, issued November 25, 1941. In vertical cross section each jaw J is approximately channel shaped having a web 38 and identical flanges 40. In Figure 3 the upper flanges 40 may be considered the inner flanges of the jaws, while the lower flanges may be considered the outer flanges thereof for the purpose of the claims appended hereto. The flanges 40 may differ in shape, but preferably they are identical so that the jaws are reversible end for end and thus their life substantially lengthened as distinguished from jaws which are not so reversible.

Figure 4:
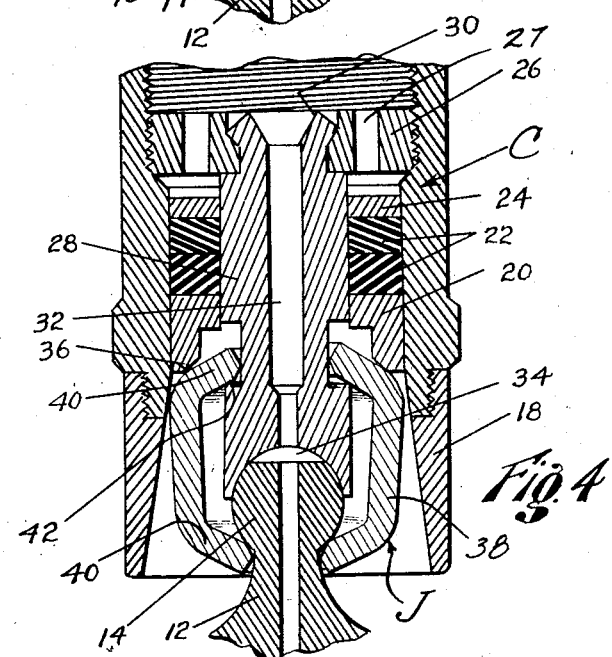

The stem 28 has an inwardly facing shoulder 42 opposing the shoulder 36 and the shoulders 36 and 42 contact the outer faces of the inner flanges 40 and the inner faces thereof respectively as shown in Figure 4. Accordingly, it is obvious that any downward pressure on the shoulder 36 will cause the inner flanges of the jaws to engage the shoulder 42 and thus result in inward swinging of the jaws from the position of Figure 3 toward the position of Figure 4.

*Practical operation*

The coupler may be applied to the fitting 12 as shown in Figure 3 by merely pushing it onto the fitting. The jaws may be at that time in expanded position so that they will readily pass over the head of the fitting. If they are not, the fitting itself will effect expansion thereof until the jaws pass the maximum diameter of the head 14.

The coupler is then manually held in the position of Figure 3, until grease pressure is applied which flows thru the passageways 27 and acts on the piston ring 20 causing it to move slightly downwardly from the position of Figure 3 to the position of Figure 4 and effect contraction of the jaws J to a position under the head of the fitting. This contracting action is caused by the shoulder 36 moving downwardly relative to the shoulder 42, and thereby swinging the inner flanges of the jaws downwardly at their outer ends which, of course, swings the webs and the lower flanges of the jaws inwardly.

The piston 20 being acted upon by relatively high pressure grease, exerts considerable force on the jaws so as to accomplish the swinging action described and the resultant effective gripping of the fitting so that the seat 34 of the stem 28 is held tightly against the head 14 of the fitting 12 in a grease tight manner. The further application of grease under pressure forces such grease through the passageway 32 into the fitting for lubricating the bearing. The tightness of the seat 34 on the fitting is increased with an increase of pressure, because the same pressure that flows through the passageway 32 acts upon the piston 20. The coupler is thereby effectively held on the fitting at all grease pressure conditions under which the coupler is used.

Some changes may be made in the construction and arrangement of the parts of my disclosed coupler without departing from the real spirit and purpose of my invention, and it is my intention to cover by my claims such modified forms of structure or use of mechanical equivalents as may be reasonably included within their scope without sacrificing any of the advantages thereof.

I claim as my invention:

1. In a coupler of the character described for a headed fitting, a sleeve-like body, a stem rigidly mounted therein for contact with the head of the headed fitting, said stem having a passageway communicating therewith, a piston in said body surrounding said stem and subjected to the fluid pressure supplied to said body and said passageway of said stem, and a plurality of contractable jaws for engaging under the head of the headed fitting to retain said stem engaged therewith, each of said jaws being substantially channel shaped with a web and a pair of flanges, said flanges being similar whereby said jaws are reversible, said stem having an inwardly facing shoulder for engaging the inner faces of the inner flanges of said jaws, said piston having an outwardly facing shoulder for engaging the outer faces of said inner flanges adjacent their outer ends, whereby said inner flanges act as levers actuated by said piston to swing the outer flanges to a retaining position under the head of the headed fitting when fluid pressure is supplied to said body.

2. In a coupler structure for a headed fitting, a sleeve-like body, a stem rigidly mounted therein and having a concave seat for sealing contact with the head of the headed fitting, said stem having a passageway affording communication between said body and said seat, a piston in said body surrounding said stem and subjected to fluid pressure supplied to said body, and a plurality of contractable jaws for engaging under the head of said fitting to retain said stem engaged therewith, each of said jaws being substantially channel shaped with a web and a pair of flanges, said stem having an inwardly facing shoulder for engaging the inner faces of the inner flanges of said jaws, said piston having an outwardly facing shoulder for engaging the outer faces of said inner flanges adjacent the point where the flanges meet said webs, whereby said inner flanges act as levers actuated by said piston to swing the outer flanges to a retaining position under the head of the headed fitting.

3. In a coupler, a sleeve-like body, a stem rigidly mounted therein for contaction with the head of a headed fitting, said stem having a passageway therethru, a piston in said body surrounding said stem and subjected to the fluid pressure supplied to said body and said passageway of said stem, and a plurality of contractable jaws for engaging under the head of said fitting to retain said stem engaged therewith, said jaws being engaged between said piston and said stem to swing inwardly at their lower ends to said retaining position under the head of the fitting when fluid pressure is supplied to said body.

4. In a device of the character described, a sleeve-like body, a stem rigidly mounted thereon and having a concave seat for sealing contact with the head of a headed lubricant reception fitting, a piston in said body subjected to lubricant under pressure supplied to said body, and a plurality of contractable jaws for engaging under the head of the fitting to retain said stem engaged therewith, each of said jaws being substantially channel shaped, said stem having an inwardly facing shoulder and said piston having an outwardly facing shoulder for engaging said jaws at radially different points so that they act as levers when actuated by said piston and thereupon swing inwardly at their outer ends to a retaining position under the head of the fitting.

5. In a coupler structure for a headed fitting, a sleeve-like body, a stem rigidly mounted therein and having a concave seat at its lower end for sealing contact with the head of the headed fitting, said stem having a central passageway affording communication between said body and said seat, a piston in said body surrounding a portion of the stem, another upper portion of the stem having passages therein affording communication between a source of fluid pressure and the top of said piston to force the piston downwardly when fluid pressure is applied, and a plurality of contractible jaws for engaging under the head of the headed fitting to retain the stem engaged therewith, each of said jaws being substantially channel-shaped with a web and a pair of flanges, said stem having an inwardly facing shoulder for engaging the inner faces of the inner flanges of said jaws, said piston having an outwardly facing shoulder for engaging the outer faces of said inner flanges adjacent their outer ends, whereby said inner flanges act as levers actuated by said piston to swing the outer flanges to a retaining position under the head of the headed fitting when fluid pressure is supplied to said body.

CLIFFORD E. FITCH.